United States Patent [19]
Dodds et al.

[11] Patent Number: 5,925,584
[45] Date of Patent: Jul. 20, 1999

[54] BORON NITRIDE-TOUGHENED SINGLE PHASE SILICON ALUMINUM OXYNITRIDE COMPOSITE, ARTICLE AND METHOD OF MAKING SAME

[75] Inventors: Gerald C. Dodds, Oaks; Richard A. Tanzilli, Malvern, both of Pa.

[73] Assignee: Lockheed Martin Corporation, Sunnyvale, Calif.

[21] Appl. No.: 07/287,179

[22] Filed: Dec. 21, 1988

[51] Int. Cl.⁶ .................................................. C06B 35/58
[52] U.S. Cl. ........................ 501/98.1; 501/96.1; 501/154
[58] Field of Search .................................. 501/98, 96, 154

[56] References Cited

U.S. PATENT DOCUMENTS

| | | | |
|---|---|---|---|
| 3,991,148 | 11/1976 | Lumby et al. | 501/98 |
| 4,113,503 | 9/1978 | Lumby et al. | 501/98 |
| 4,127,416 | 11/1978 | Lumby et al. | 501/98 |
| 4,243,621 | 1/1981 | Mori et al. | 501/98 |
| 4,304,870 | 12/1981 | Rice et al. | 501/98 |
| 4,310,499 | 1/1982 | Mitomo et al. | 423/327 |
| 4,377,542 | 3/1983 | Mangels et al. | 264/65 |
| 4,421,528 | 12/1983 | Buljan et al. | 501/98 |
| 4,438,051 | 3/1984 | Mitomo et al. | |
| 4,539,300 | 9/1985 | Coblenz | 501/98 |
| 4,552,711 | 11/1985 | Raj et al. | 264/65 |
| 4,666,873 | 5/1987 | Morris, Jr. et al. | 501/96 |
| 4,711,644 | 12/1987 | Yeckley et al. | 51/307 |
| 4,720,362 | 1/1988 | Gentilman et al. | 264/1.2 |

FOREIGN PATENT DOCUMENTS

| | | | |
|---|---|---|---|
| 1209956 | 3/1985 | Japan | C04B 35/58 |

OTHER PUBLICATIONS

Silica, Boron Nitride, Aluminum Nitride, Alumina Composite, Article and Method of Making Same, Copending U.S. Application Serial No. 287, 233 filed Dec. 21, 1988–Dodds and Tanzilli.

*Primary Examiner*—Peter A. Nelson
*Attorney, Agent, or Firm*—W. H. Meise; L. B. Wegemer

[57] ABSTRACT

Multiphase ceramic composites containing single phase silicon aluminum oxynitride and boron nitride wherein the boron nitride is one phase in the composite and the single phase silicon aluminum oxynitride is the matrix phase in the composite. The boron nitride phase is uniformly distributed in the form of discrete particles throughout the single phase silicon aluminum oxynitride matrix. A window transparent to electromagnetic radiation in a predetermined frequency spectrum is made by forming a homogeneous, finely-divided mixture of boron nitride and single phase silicon aluminum oxynitride matrix-forming compound and compacting the homogeneous, finely-divided mixture at an elevated temperature and pressure for a sufficient time to form the composite. In a preferred embodiment, about 75% by weight homogeneous, finely-divided mixture of single phase silicon aluminum oxynitride matrix-forming compound and the balance boron nitride is densified at a temperature of 1,760° C. and at a pressure of about 3,775 p.s.i. for about 1 hour. The single phase silicon aluminum oxynitride corresponds to the formula: $Si_{6-x} Al_x O_x N_{8-x}$, where x is at least 0.1 and less than or equal to 4.2, and preferably 3 or 4. The single phase silicon aluminum oxynitride matrix is derived from any effective combination of aluminum nitride, silicon nitride, silica and alumina.

30 Claims, 5 Drawing Sheets

BORON NITRIDE-TOUGHENED SINGLE PHASE SILICON ALUMINUM OXYNITRIDE COMPOSITE, ARTICLE AND METHOD OF MAKING SAME

This invention was made with government support under contract number F04704-86-C-0097 awarded by Ballistic Missile Office. The government has certain rights in this invention.

BACKGROUND OF THE INVENTION

The present invention relates to single phase silicon aluminum oxynitride-boron nitride composites and articles and to a method of making the composites and articles, and more particularly, to a multiphase ceramic composite consisting of boron nitride dispersed throughout a matrix of single phase silicon aluminum oxynitride, a window transparent to electromagnetic radiation made therefrom and to a method for making the same.

High-speed vehicles, such as high-speed aircraft, may be required to pass through a hostile environment. Under these conditions, it may become necessary to provide protection for certain communication and detection apparatus carried by such a vehicle from sources of heat shock and pressure shock. In such high-speed vehicles, such shock is typically due to frictional contact with the ambient environment. Protection from heat and pressure shock must be provided without detracting from the ability of the protected apparatus to communicate with the outside of the vehicle by means of electromagnetic radiation within the frequency spectrum of interest. A common way of providing the desired protection is to place the apparatus behind a suitable window, which is transparent to the desired frequency spectrum of electromagnetic radiation, sometimes referred to as an electromagnetic window or an antenna window.

Currently available compositions for providing such an electromagnetic window or antenna window often lack the requisite mechanical strength, toughness and thermal shock resistance. In U.S. Pat. No. 4,666,873, Morris, Jr. and Tanzilli have provided an improved window transparent to electromagnetic radiation in a predetermined frequency spectrum wherein the window is made from a ceramic material containing about 0.01 percent to about 35 percent by volume boron nitride and aluminum nitride. In U.S. Pat. No. 4,666,873, which is incorporated herein by reference in its entirety, an article is fabricated by mixing powders of the specified materials; shaping the mixture into the desired form of the article; and densifying the mixture in a non-oxidizing medium at a temperature, pressure and time sufficient to form a structural ceramic. Morris, Jr., and Tanzilli found that the resulting ceramic article could be used to protect apparatus from damage due to heat or pressure shock without detracting from the ability of the apparatus to communicate through the ceramic article (window) by means of electromagnetic radiation in a predetermined frequency spectrum.

Although U.S. Pat. No. 4,666,873 provides a ceramic article, such as an electromagnetic window, having excellent characteristics, it is always desirable to provide alternative composites and articles made therefrom wherein one or more of the properties are improved. A composite for use as an electromagnetic window ideally possesses transparency to electromagnetic radiation in a predetermined frequency spectrum over a wide temperature range, congruent vaporization kinetics, appropriate dielectric properties, thermal shock resistance over a wide range of heating rates, mechanical strength and toughness, spall resistance, high refractoriness, and a low erosion rate and ablation rate.

In a copending patent application Ser. No. 07/287,233 of Dodds and Tanzilli filed concurrently herewith on Dec. 21, 1988 for Docket No. 39-RE-2767 entitled Silica, Boron Nitride, Aluminum Nitride, Alumina Composite, Article and Method of Making Same and assigned to the instant assignee, it was discovered that several of the foregoing properties were improved in a multiphase ceramic composition containing about 47% to about 52% by weight aluminum nitride, about 23% to about 27% by weight silica, about 3% to about 7% percent by weight alumina and the balance boron nitride, the boron nitride being one phase in the composite and the reaction products of aluminum nitride, silica and alumina being the matrix phase in the composite, wherein the boron nitride phase is uniformly distributed in the form of discrete particles throughout the multiphase reaction products of aluminum nitride, silica and alumina. It was found that the multiphase ceramic composite of silica, boron nitride, aluminum nitride and alumina resulted in a composite combining moderate thermal expansion, low thermal conductivity, improved high temperature radar transmission and improved toughness to make an excellent antenna window material. However, it remains desirable to provide composites, and articles made therefrom, having one or more of the foregoing properties improved.

Single phase silicon aluminum oxynitrides corresponding to the formula $Si_{6-z}Al_zN_{8-z}O_z$ where z is greater than 0 and less than or equal to 5 have been prepared using magnesium oxide in an amount of not more than 5% by weight to form a magnesium silicate glass to aid in densification of the ceramic material formed therefrom in U.S. Pat. No. 3,991,148 which is incorporated herein in its entirety for its teachings relating to single phase silicon aluminum oxynitride and the formation of the single phase silicon aluminum oxynitride from effective amounts of silica, alumina and aluminum nitride. Ceramic materials are also made from single phase silicon aluminum oxynitride in U.S. Pat. No. 4,113,503 wherein the silicon aluminum oxynitride is derived from various compounds containing two or more of the elements silicon, aluminum, oxygen and nitrogen. U.S. Pat. No. 4,113,503 is incorporated by reference herein in its entirety for its teachings relating to the method of forming a single phase silicon aluminum oxynitride. Although U.S. Pat. Nos. 3,991,148 and 4,113,503 teach single phase silicon aluminum oxynitrides and ceramic materials derived therefrom, it is desirable to improve various properties thereof including toughness so that articles formed therefrom can withstand heat shock and pressure shock in hostile environments.

OBJECTS OF THE INVENTION

Accordingly, it is the primary object of the present invention to provide new composites in which one or more of the prior art properties discussed above are improved.

It is another object of the present invention to provide new and improved composites which can be shaped into an article, such as an electromagnetic window or an antenna window, which exhibits improved high temperature radar transmission.

It is still another object of the present invention to provide a composite ceramic material derived from single phase silicon aluminum oxynitride which can be fabricated into an electromagnetic window or antenna window, having improved toughness.

Another object of the present invention is to provide a new and improved ceramic composite which can be fabricated into an electromagnetic window or antenna window, having lower thermal expansion and lower thermal conductivity.

Still another object of the present invention is to provide a method of fabricating a window transparent to electromagnetic radiation in a predetermined frequency spectrum from a single phase silicon aluminum oxynitride wherein the window has improved toughness.

SUMMARY OF THE INVENTION

These and other objects are achieved by providing a multiphase ceramic composite having a dispersed boron nitride phase and a single phase silicon aluminum oxynitride matrix corresponding to the formula:

$$Si_{6-x}Al_xO_xN_{8-x}$$

where x is at least 0.1 and less than or equal to 4.2, wherein the boron nitride is uniformly distributed in the form of discrete particles throughout the single phase silicon aluminum oxynitride matrix.

The single phase silicon aluminum oxynitride matrix is the reaction product of at least three silicon aluminum oxynitride-forming compounds, otherwise defined herein as matrix-forming compounds, selected from the group consisting of aluminum nitride, silicon nitride, silica and alumina, and the boron nitride phase is uniformly distributed in the form of discrete particles throughout the single phase silicon aluminum oxynitride matrix. In certain preferred embodiments in accordance with the present invention the single phase silicon aluminum oxynitride matrix is the reaction product of all four silicon aluminum oxynitride-forming compounds, namely, aluminum nitride, silicon nitride, silica and alumina. In the present invention the multiphase ceramic composition contains at least about 60% by volume silicon aluminum oxynitride matrix and the balance boron nitride.

Effective amounts of at least three or all four of the silicon aluminum oxynitride-forming compounds, namely, aluminum nitride, silicon nitride, silica and alumina, are provided and the relative proportions of the three or four compounds, aluminum nitride, silicon nitride, silica and alumina, are such that the single phase silicon aluminum oxynitride matrix corresponding to the formula $Si_{6-x}Al_xO_xN_{8-x}$ where x is greater than 0 and less than or equal to 4.2, is the reaction product of three or four of the compounds, aluminum nitride, silicon nitride, silica and alumina.

It has been found that the multiphase ceramic composite of single phase silicon aluminum oxynitride matrix and a dispersed boron nitride phase results in a composite having improved thermal expansion, low thermal conductivity, low loss tangent leading to improved high temperature radar transmission, improved dielectric constant and improved toughness to make an excellent antenna window material.

In accordance with the objects of the present invention, there is also provided a method for the fabrication of a multiphase composite ceramic material containing boron nitride and a single phase silicon aluminum oxynitride matrix by forming a homogeneous finely-divided mixture of boron nitride and effective amounts of at least three silicon aluminum oxynitride-forming compounds selected from the group consisting of aluminum nitride, silicon nitride, silica, and alumina, the relative proportions of which are sufficient to form a single phase silicon aluminum oxynitride matrix corresponding to the formula $Si_{6-x}Al_xO_xN_{8-x}$ where x is at least 0.1 and less than or equal to 4.2; and compacting the homogeneous, finely-divided mixture in an inert atmosphere at an elevated temperature and pressure for a sufficient time to form the single phase silicon aluminum oxynitride matrix as a reaction product of at least three compounds selected from the group consisting of aluminum nitride, silicon nitride, silica and alumina and having the boron nitride uniformly distributed in the form of discrete particles throughout the single phase silicon aluminum oxynitride matrix, whereby the boron nitride is one phase and the single phase reaction product of any three or more of the following compounds, aluminum nitride, silicon nitride, silica and alumina, is the matrix phase in the composite. The articles or windows are fabricated by mixing boron nitride with sufficient amounts of at least three of the following compounds, silica, silicon nitride, aluminum nitride and alumina, in relative proportions to form a single phase silicon aluminum oxynitride matrix; shaping the mixture into substantially the desired form of the article or window; and densifying the mixture, preferably in a non-oxidizing medium, at a temperature, pressure and time sufficient to form a structural ceramic material or window.

The resulting ceramic composite, article or window, for example, an electromagnetic window or antenna window, may be used to protect apparatus from damage due to heat or pressure shock without detracting from the ability of such apparatus to communicate through the article or window by means of electromagnetic radiation in a predetermined frequency spectrum. For example, where the apparatus is located within a vehicle, the window is shaped to conform to the window opening of the vehicle and to the vehicle contours in the vicinity of such opening and is used to protect the apparatus against harm.

The foregoing and various other objects of the invention will become clear from the following detailed description taken in conjunction with the accompanying drawings.

DETAILED DESCRIPTION OF THE INVENTION

Aluminum nitride possesses several characteristics which make it suitable as a structural ceramic article in applications requiring radar transparency and strength, such as, the use as an electromagnetic window on high-speed aircraft. Although aluminum nitride may be suitable in some aspects, it does not possess a complete combination of characteristics which make it desirable for the above applications. In accordance with the present invention, it has been found that if particles of boron nitride are dispersed in a matrix of single phase silicon aluminum oxynitride corresponding to the formula $Si_{6-x}Al_xO_xN_{8-x}$ where x is at least 0.1 and less than or equal to 4.2, to form a multiphase composite where the single phase silicon aluminum oxynitride is at least about 60% by volume of the composite and the balance is boron nitride, the composite has certain new and unexpected desirable characteristics, while preserving the desirable characteristics, such as the radar transparency and congruent vaporization kinetics already present in the pure aluminum nitride.

In the present invention, the single phase silicon aluminum oxynitride matrix is the reaction product of at least three silicon aluminum oxynitride-forming compounds, and preferably four silicon aluminum oxynitride-forming compounds. These silicon aluminum oxynitride-forming compounds are aluminum nitride, silicon nitride, silica and alumina. The three or four silicon aluminum oxynitride-forming compounds are mixed as powders with boron nitride powder and formed and densified to produce a multiphase particulate ceramic composite or a window transparent to electromagnetic radiation in a predetermined frequency spectrum. The mixing, forming and densifying steps may be performed in accordance with conventional techniques known to the art so as to produce a structural ceramic or a window of appropriate quality.

The ratio of single phase silicon aluminum oxynitride matrix to boron nitride in the multiphase ceramic composite of the present invention is not critical. Generally, in preferred embodiments, the single phase silicon aluminum oxynitride matrix is at least about 60% by volume of the composite, and the balance is boron nitride. In more preferred embodiments, the single phase silicon aluminum oxynitride matrix is about 70% by volume to about 90% by volume of the composite, and the balance of the composite is boron nitride. As indicated above, the amount of boron nitride uniformly distributed in the form of discrete particles throughout the single phase silicon aluminum oxynitride matrix is not critical as long as there is a sufficient amount of the boron nitride to toughen the composite. Although amounts of boron nitride greater than 40% by volume can be used in the composites of the present invention, no improvement in the properties of the composites is achieved by incorporating amounts of boron nitride greater than 40% by volume. Although amounts of boron nitride less than 10% by volume may be incorporated in the single phase silicon aluminum oxynitride matrix in accordance with the present invention, there is reduced toughening of the composite.

As discussed above, the single phase silicon aluminum oxynitride matrix corresponds to the formula: $Si_{6-x}Al_xO_xN_{8-x}$ where x is at least 0.1 and less than or equal to 4.2, and is otherwise known in the art as β'-Sialon. In preferred embodiments of the present invention, the ceramic composite contains the single phase silicon aluminum oxynitride matrix where x is 4, and the general formula of the single phase silicon aluminum oxynitride matrix is $Si_2Al_4O_4N_4$, or the ceramic composite contains single phase silicon aluminum oxynitride matrix where x is 3 and the general formula of the single phase silicon aluminum oxynitride matrix is $Si_3Al_3O_3N_5$.

Figure 1:
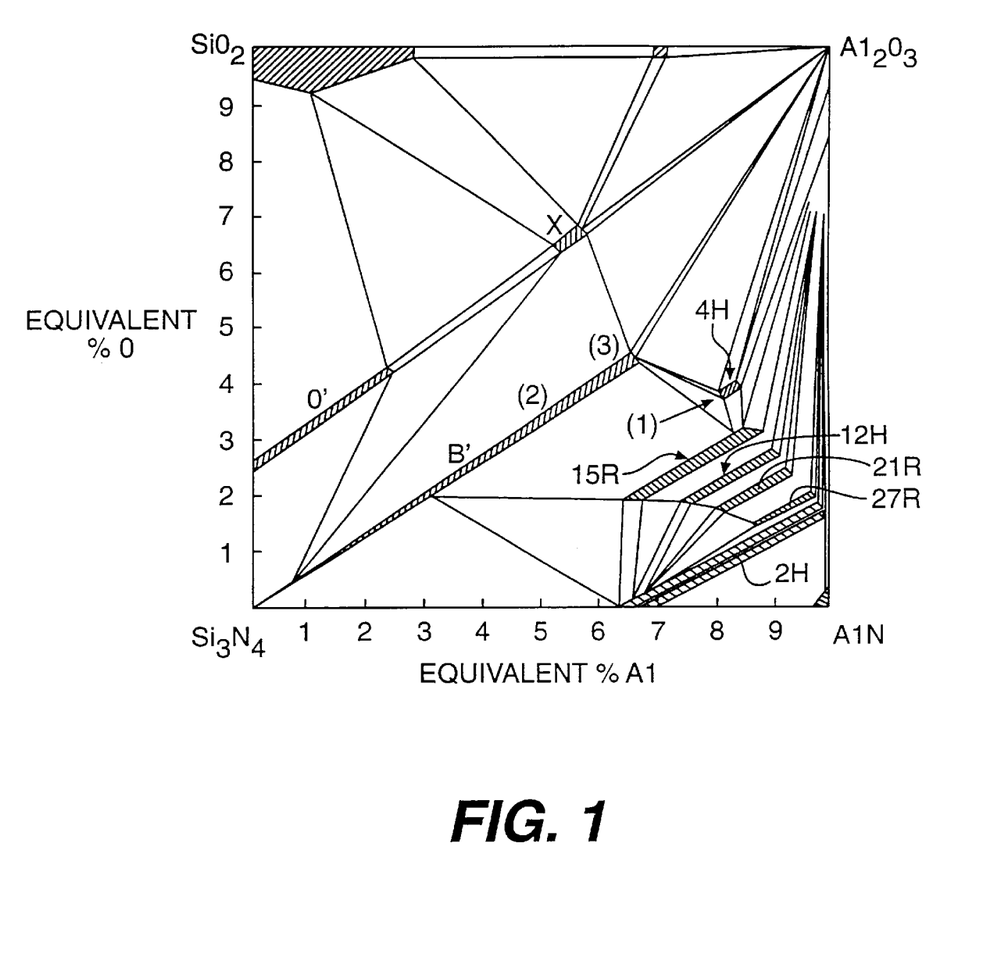
FIG. 1 is an isothermal cross-section of the $Si_3N_4$-AlN-$SiO_2$-$Al_2O_3$ quaternary phase diagram at 1760° C. showing the single phase silicon aluminum oxynitride matrix where x=3 (2) and the single phase silicon aluminum oxynitride matrix where x=4 (3) corresponding to the preferred matrices in the composites of the present invention, compared to the multiphase silicon aluminum oxynitride matrix (1) of the prior art.

The single phase silicon aluminum oxynitride matrix can be prepared with any effective combination of the compounds found on the $Si_3N_4$-AlN-$Al_2O_3$-$SiO_2$ quaternary phase diagram shown in FIG. 1. Thus, in accordance with the present invention, the single phase aluminum oxynitride matrix can be derived from silicon nitride, aluminum nitride and alumina; aluminum nitride, alumina and silica; alumina, silica and silicon nitride; silica, silicon nitride and aluminum nitride or silicon nitride, aluminum nitride, alumina and silica.

In general, and as discussed in more detail below, the preferred method of the present invention includes wet ball milling silicon nitride, aluminum nitride and silica powders using alumina grinding media under reagent-grade acetone, and accordingly, except for any $Al_2O_3$ impurities in aluminum nitride, alumina addition to the mixture is due to the self-attrition of the grinding media.

There are an infinite number of effective combinations and amounts of the compounds shown at each of the four corners of the quaternary phase diagram of FIG. 1 which will yield the single phase silicon aluminum oxynitride matrix of the present invention. The effective amounts of each of the respective ingredients can be calculated as follows. First, when alumina is used as the grinding media, the amount of alumina picked up during the milling process is estimated. This step can be eliminated if there is no alumina present, or if the grinding media is other than alumina. Secondly, the amount of oxide impurities in the nitride powders, that is, the silica in silicon nitride and the alumina in aluminum nitride, is estimated by conventional techniques. The amount of silicon nitride, aluminum nitride and silica are then calculated so that the following molar ratio will be achieved, taking into account the impurities estimated in the silicon nitride and aluminum nitride.

|  | x = 3*<br>β'-SIALON<br>$Si_3Al_3O_3N_5$ | x = 4*<br>β'-SIALON<br>$Si_2Al_4O_4N$ |
|---|---|---|
| Moles Silicon | 3 | 2 |
| Moles Aluminum | 3 | 4 |
| Moles Oxygen | 3 | 4 |
| Moles Nitrogen | 5 | 4 |

*in $Si_{6-x}Al_xO_xN_{8-x}$

The mixing of any three of the single phase silicon aluminum oxynitride-forming compounds and the effective amounts and relative proportions thereof required to form the single phase silicon aluminum oxynitride matrix compounds having the formula shown above are discussed and described in U.S. Pat. Nos. 3,991,148 and 4,113,503 which have been incorporated herein by reference in their entirety. For example, it can be seen from the teachings of U.S. Pat. No. 3,991,148 that a single phase silicon aluminum oxynitride can be produced from a mixture consisting of 86.5% by weight of silicon nitride, 10% by weight of alumina and 3.5% by weight of aluminum nitride, and the like. The various silicon aluminum oxynitride-forming compounds useful in the present invention and discussed above can be varied in any number of proportions of any three or all four of the silicon aluminum oxynitride-forming compounds. If the relative proportion of one of the compounds is reduced, then it is possible for one skilled in the art to make up that deficiency by the addition of one or more of the other single phase silicon aluminum oxynitride-forming compounds. In all cases, in accordance with the present invention, the effective amounts of the single phase silicon aluminum oxynitride-forming compounds can be easily adjusted to provide relative proportions which result in the formation of the single phase silicon aluminum oxynitride matrix which can be used to form the composite of the present invention. Thus, any mixture of at least three or all four of the single phase silicon aluminum oxynitride-forming compounds can be mixed to form the matrix of the present invention when the atomic ratio of silicon: aluminum: oxygen: nitrogen is substantially in the proportions of 6-x:x:x:8-x respectively where x is equal to 0.1 to 4.2, and preferably where x equal 3 or x equal 4 in which case the atomic ratio of silicon: aluminum: oxygen: nitrogen is in the proportions shown in the table above, namely, 3:3:3:5 where x equal 3, and 2:4:4:4 where x equal 4. Using these relative proportions, one skilled in the art can provide the appropriate effective amount of the respective silicon aluminum oxynitride-forming compounds selected from the group consisting of silicon nitride, aluminum nitride, silica and alumina to form the single phase silicon aluminum oxynitride matrix used in the composites, articles and methods of the present invention.

The aluminum nitride, silicon nitride, silica, and alumina as well as the boron nitride should be free of impurities which interact with the components in a manner which compromises the integrity of the ceramic, or which compromises the purity or formation of the single phase silicon aluminum oxynitride matrix, or which compromises any of the desired characteristics or properties of the composite. In accordance with the present invention, it is desirable, though not essential, that the powders or source of the powders be purified so that they are at least about 95% by weight pure. Preferably, the powders of boron nitride, aluminum nitride, silicon nitride, silica and alumina have a purity, such as, for example, about 98% by weight pure. Whenever possible and within practical limits, the powders used in the compositions of the present invention are about 99.9% by weight pure. The use of high purity powders improves some of the characteristics of the composite which make the composite suitable for use as an electromagnetic window because they result in a single phase silicon aluminum oxynitride matrix of high purity. For example, high purity powders usually improve radar transparency. In most cases, impurities diminish the excellent radar transparency normally exhibited by the single phase silicon aluminum oxynitride matrix-boron nitride composites of the present invention, and they compromise the integrity of the single phase reaction product of silicon aluminum oxynitride-forming compounds.

Aluminum nitride is generally the major constituent in the matrix of the composite. The importance of the aluminum nitride in the composition is explained in detail in U.S. Pat. No. 4,666,873 where it is also indicated that in order to aid congruent vaporization kinetics during the varporization of the composite, a small quantity of an oxygen-containing compound may optionally be added at certain boron nitride percentages in the composite. These oxygen-containing compounds may prevent the undesirable effects of the non-congruent vaporization kinetics of boron nitride by preventing the deposition of boron as a metal on the surface of the electromagnetic window. Contrary to the findings set forth in U.S. Pat. No. 4,666,873, where it is indicated that silica (silicon dioxide) can be introduced into the composite therein as well as alumina or boric oxide, as oxidizing agents which significantly or substantially reduce radar transmission, it has been found that silica can be advantageously used in the matrix of the present invention in proportions nearly as high as the aluminum nitride, and furthermore, in addition to the silica, alumina can be used in forming the matrix of the present invention without adverse effect on the properties.

During the densification of the mixture of the present invention at an elevated temperature and at an elevated pressure, namely, for example, during the hot pressing sequence, any effective combination of three or all four of the silicon aluminum oxynitride-forming compounds, namely, aluminum nitride, silicon nitride, silica and alumina, react to form the single phase $\beta'$-Sialon as revealed by powder X-ray diffraction (XRD) analysis. This composite falls in the single phase, $\beta'$-Sialon region of the $Si_3N_4$-AlN-$SiO_2O_3$ quaternary diagram as shown in FIG. 1 which represents the isothermal cross-section of the $Si_3N_4$-AlN-$Al_2O_3$-$SiO_2$ phase diagram at 1760° C. The X-ray diffraction analysis also shows that boron nitride does not react significantly with the other constituents in the composite and remains as a discrete, separate phase throughout the process. Thus, in accordance with the present invention, the boron nitride is uniformly distributed in the form of discrete particles throughout the single phase silicon aluminum oxynitride matrix. The discrete particles of boron nitride are dispersed throughout the single phase, $\beta'$-Sialon region of the isothermal cross-section of the quaternary phase diagram of FIG. 1, the two single phase regions being shown by the designation (2), representing $Si_3Al_3O_3N_5$, and (3), representing $Si_2Al_4O_4N_4$.

The starting ingredients of the present invention, namely, the aluminum nitride, silicon nitride, silica, boron nitride and alumina can be obtained from any conventional source as discussed above and can be further refined and purified as desired. The powders are generally commercially available in various degrees of purity and size. Although there is no limitation as to the size of the particles in the aluminum nitride powder, silicon nitride powder, silica powder or alumina powder, generally, the maximum particle size which should be used within the scope of the present invention is that which permits the densification of the composite and which permits the effective chemical combination of three or all four of the following ingredients, namely, aluminum nitride, silicon nitride, silica and alumina at elevated temperature and pressure over a period of time to form the reaction products defined by the single phase $\beta'$-Sialon region in the quaternary phase diagram of FIG. 1. In accordance with the present invention, the maximum particle size generally recommended is about 74 microns for the aluminum nitride, silicon nitride, silica and alumina, and more preferably, the maximum particle size for aluminum nitride, silicon nitride, silica and alumina is about 44 microns.

The maximum particle size of the boron nitride dispersed in the single phase silicon aluminum oxynitride matrix is more critical, and, in accordance with the present invention, the maximum particle size is about 10 microns or about 0.5 micron to about 10 microns. In most preferred embodiments, the boron nitride particle size is about 1 to about 5 microns. The particle size of the boron nitride is more critical than the other constituents of the composition of the present invention in view of the fact that the boron nitride remains as a separate phase and is uniformly distributed in the form of discrete particles throughout the single phase silicon aluminum oxynitride matrix.

In general, the particle size of the constituents used in the composition of the present invention are as small as practical manufacturing limits permit. The tendency of the particles to agglomerate generally limits the particle size ranges which can be obtained by conventional milling techniques. However, the present invention is intended to encompass particle sizes down to the molecular level.

In certain embodiments of the present invention, the single phase silicon aluminum oxynitride matrix and dispersed boron nitride composite ceramic material is fabricated by forming a homogeneous finely-divided mixture of boron nitride and any three or all four of the matrix-forming compounds, aluminum nitride, silicon nitride, silica, and alumina from finely-divided powders thereof. In certain preferred embodiments of the present invention, the source of the alumina is from the use of alumina grinding media used in the ball mill to grind and/or homogenize the aluminum nitride, silicon nitride, silica and boron nitride. The grinding of the aluminum nitride, silicon nitride, silica and boron nitride is carried out for a sufficient amount of time to provide the necessary amount of finely-divided alumina at the effective concentration to form the single phase silicon aluminum oxynitride matrix. Thus, instead of mixing powders of boron nitride and any three or all four compounds of aluminum nitride, silicon nitride, silica, and alumina, boron nitride powders, powders of any two or all three compounds of aluminum nitride, silicon nitride and silica are mixed in the presence of an alumina grinding media which disperses the necessary amount of alumina, namely, an effective amount in relative proportion such that there is formed the single phase silicon aluminum oxynitride matrix, from the alumina grinding media and any two or all three of the powders of aluminum nitride, silicon nitride and silica. By this technique, the homogeneous, finely-divided mixture is formed by grinding boron nitride and any two or all three compounds, namely, aluminum nitride, silicon nitride and silica in a ball mill using alumina grinding media for a sufficient time to form the homogeneous, finely-divided mixture of boron nitride and silicon aluminum oxynitride-forming compounds, the alumina being generated in the mixture by attrition of the alumina grinding media.

The primary purpose of the mixing step in the process is to form a finely-divided, homogeneous mixture of the boron nitride powder and the powders of the silicon aluminum oxynitride-forming compounds from which the matrix phase is formed. In certain preferred embodiments, the particle size of the powders is also reduced during the mixing step by milling. The mixing and milling may be performed in any suitable device, for example, a milling device, such as, a conventional ball mill. As used herein, the term "mixing" defines any operation including milling or any combination of mixing and milling which forms a finely-divided homogeneous mixture of boron nitride powder and the powders of the silicon aluminum oxynitride-forming compounds in the particular combinations and proportions used and provides a mixture having the particle sizes designated above. This mixture can first be formed, if necessary, into a green ceramic body and subsequently densified into a ceramic component.

A simultaneous mixing and milling of the powders is preferred due to the reduction in particle size and the degree of agglomeration obtained thereby. Such reduction in particle size and degree of agglomeration results in a ceramic having superior characteristics, for example in the area of mechanical strength and toughness, due to a higher degree of dispersion of the boron nitride in the single phase silicon aluminum oxynitride matrix. A preferred mixing method comprises milling boron nitride powder, for example of about 0.5 to about 10 microns, with aluminum nitride powder, silicon nitride powder and silica powder less than 44 microns in diameter for 24 hours in the presence of a milling media such as an $Al_2O_3$ grinding media. In order to further reduce particle size and bring about more complete mixing, a liquid medium may additionally be used during the milling process, e.g. any of several inert, non-reactive liquid organic media known in the art. By way of example and without limitation, a suitable liquid medium is reagent-grade acetone. In a preferred embodiment, the mixing step embraces wet milling of the single phase silicon aluminum oxynitride-forming compounds and boron nitride in the presence of reagent-grade acetone as a liquid medium, with an alumina grinding medium. Thus, the boron nitride and silicon aluminum oxynitride-forming compounds which include alumina, are ground in the ball mill using alumina grinding media and an inert liquid organic medium, for example, reagent-grade acetone, for a sufficient time to form a wet, homogeneous mixture of boron nitride and the single phase silicon aluminum oxynitride-forming compounds. The wet, homogeneous mixture can then be dried, as discussed in more detail below, and converted to a finely-divided mixture for compacting or densification.

Densification or compacting of the ceramic composite to produce a ceramic article may be accomplished by any method known in the art, for example, by hot pressing, hot isostatic pressing, pressureless sintering and the like or selected combinations of the preceding techniques. These methods utilize variations in temperature, pressure and time to bind and consolidate the discrete ceramic powders into a densified ceramic component. The time, temperature and pressure used to form a structural ceramic in accordance with the present invention is not critical, and one skilled in the art can provide appropriate conditions for densifying the mixture to form a structural ceramic. It is only necessary that the step of densifying the mixture be carried out at a temperature, pressure and time sufficient to form the single phase silicon aluminum oxynitride matrix which is the reaction product of any three or all four of the compounds aluminum nitride, silicon nitride, silica and alumina as described above and thereby form a structural ceramic.

In preferred embodiments of the present invention, the homogeneous, finely-divided mixture is compacted or densified at a temperature of at least about 1760° C. and a pressure of at least about 3775 p.s.i. for about 1 hour in a protective environment.

In some methods of densification, for example, hot isostatic pressing and pressureless sintering, the formation of a green ceramic body is required before densification. The process of forming a green body involves shaping the ceramic article so that, shaping and forming occur simultaneously. Methods of forming a green ceramic body are well known to those experienced in the art and include, but are not restricted to, die pressing, isostatic pressing and slip casting. Thus, according to the present method, the formation of a green body may be a necessary or a preferred step prior to densification.

It is to be understood that, at all stages of processing, the powders must be protected by a non-oxidizing atmosphere due to the susceptibility of these powders to oxidation. Inert environments which are suitable for use as non-oxidizing atmosphere, are, for example, a vacuum, nitrogen, a noble gas or the like. For example, in preferred embodiments, the wet, homogeneous mixture is dried with nitrogen gas and thereafter converted to a finely-divided mixture by passing the dried mixture through a sieve.

A typical electromagnetic window which is interposed between a source of heat and pressure shock and an apparatus which communicates through electromagnetic radiation, is shown in FIG. 2B of U.S. Pat. No. 4,666,873 which is incorporated herein by reference in its entirety. The ceramic article having the composite of the present invention and prepared by the method of the present invention can be used as the window shown therein.

The following examples further illustrate the practice of the present invention. The examples are meant to be exemplary only and are not to be construed as limiting the invention in any way.

EXAMPLE 1

Allowing for 6.1 grams of alumina from alumina grinding media, a precursor powder mixture of 38.47 grams aluminum nitride, 4.59 grams of silicon nitride, 25.85 grams of silica and 25.0 grams of boron nitride was ground and homogenized by wet ball milling under reagent grade acetone for 24 hours using high purity alumina ($Al_2O_3$) grinding media. By calculating the amount of alumina impurity in the aluminum nitride and the attrition of the alumina grinding media, 6.1 grams of alumina were added to the mixture by impurities and by attrition during grinding. The boron nitride (25.0 grams) represented 30% by volume of the total precursor powder mixture. The powder was dried in a nitrogen-filled dry box to minimize contact with the atmosphere due to the hygroscopic nature of aluminum nitride, passed through a −325 mesh sieve, and hot pressed at 1760° C. and 3775 p.s.i. for 1 hour under flowing nitrogen gas in a boron nitride-lined graphite die.

The reaction product produced by the foregoing powder mixture of aluminum nitride, silicon nitride, silica and alumina was $Si_2Al_4O_4N_4$ and has been discussed above relative to the quaternary phase diagram shown in FIG. 1. As discussed above, the X-ray diffraction analysis reveals the particular reaction product and the dispersion of the boron nitride as a discrete, separate phase throughout a single phase silicon aluminum oxynitride matrix corresponding to the formula $Si_2Al_4O_4N_4$.

The physical properties of the foregoing ceramic composite material having about 30% by volume boron nitride dispersed in the $Si_2Al_4O_4N_4$ matrix are listed in Table I below:

TABLE 1

Boron Nitride/$Si_2Al_4O_4N_4$
Physical Properties of Ceramic Composite Material Density: 2.74 gm/cc
Modulus of Rupture: 44,920 p.s.i.
Modulus of Elasticity: 17.1 m.s.i.
Thermal Expansion Coefficient, 20–1020° C.: $2.65 \times 10^{-6}$/° C.
Thermal Conductivity, 100° C.: 0.0687 W/cm-° K.
                              1200° C.: 0.0440 W/cm-° K.
Specific Heat, 100° C.: 0.213 cal/gm-° K.
                1200° C.: 0.324 cal/gm-° K.
Dielectric Constant, 35 GHz, 25° C.: 6.616
                          1000° C: 7.67
Loss Tangent, 36 GHz, 25° C.: 0.0032
                    1000° C.: 0.0144

Figure 2:
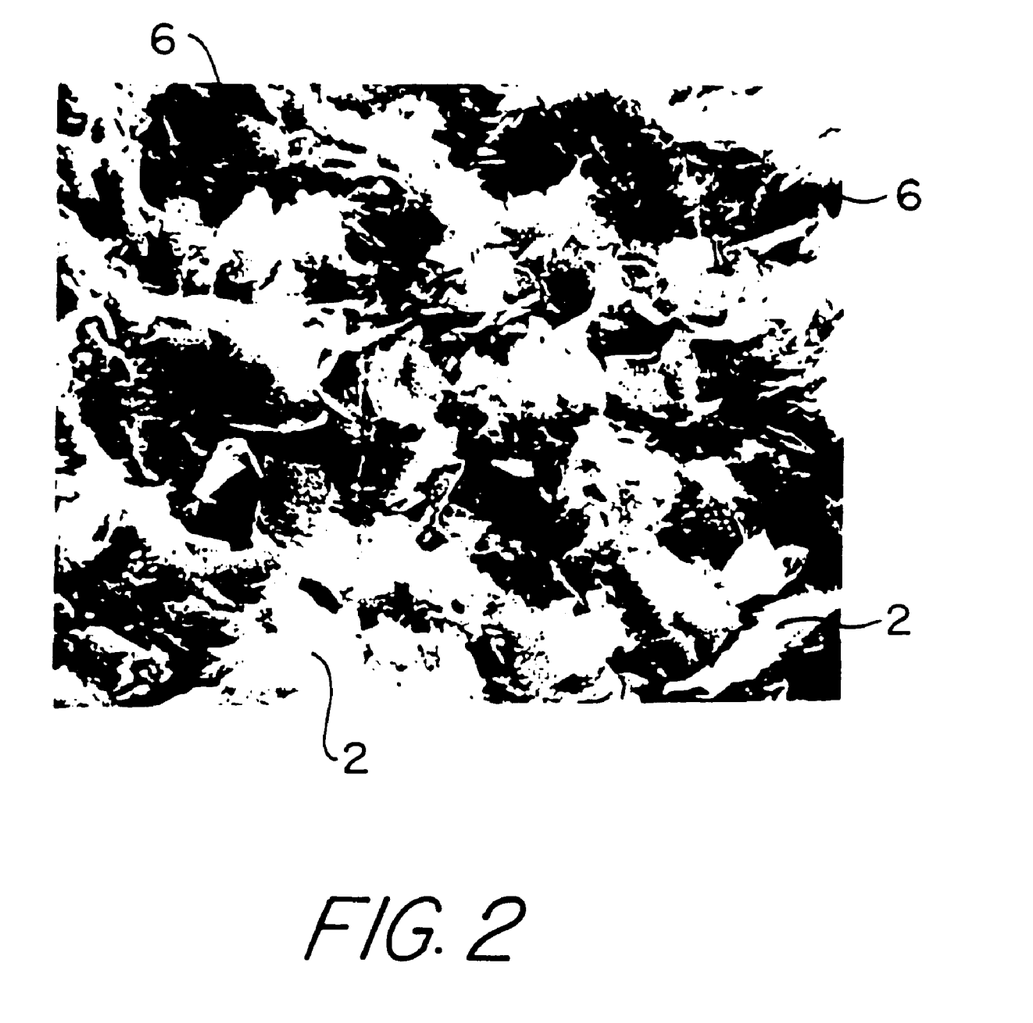
FIG. 2 is a photomicrograph at a magnification of 3000× showing the single phase silicon aluminum oxynitride matrix and the dispersed boron nitride phase composite material of the present invention.

The accompanying scanning electron microscopy micrograph of a fracture surface of the foregoing composite of the present invention and identified as FIG. 2, shows boron nitride particles as white platelets 2. Boron nitride particles are generally in the shape of thin hexagonal platelets as shown in FIG. 2. In the photomicrograph of FIG. 2, the whiter areas and lines are boron nitride platelets 2 and the darker or gray areas 6 are grains of single phase $Si_2Al_4O_4N_4$ matrix.

Figure 3:
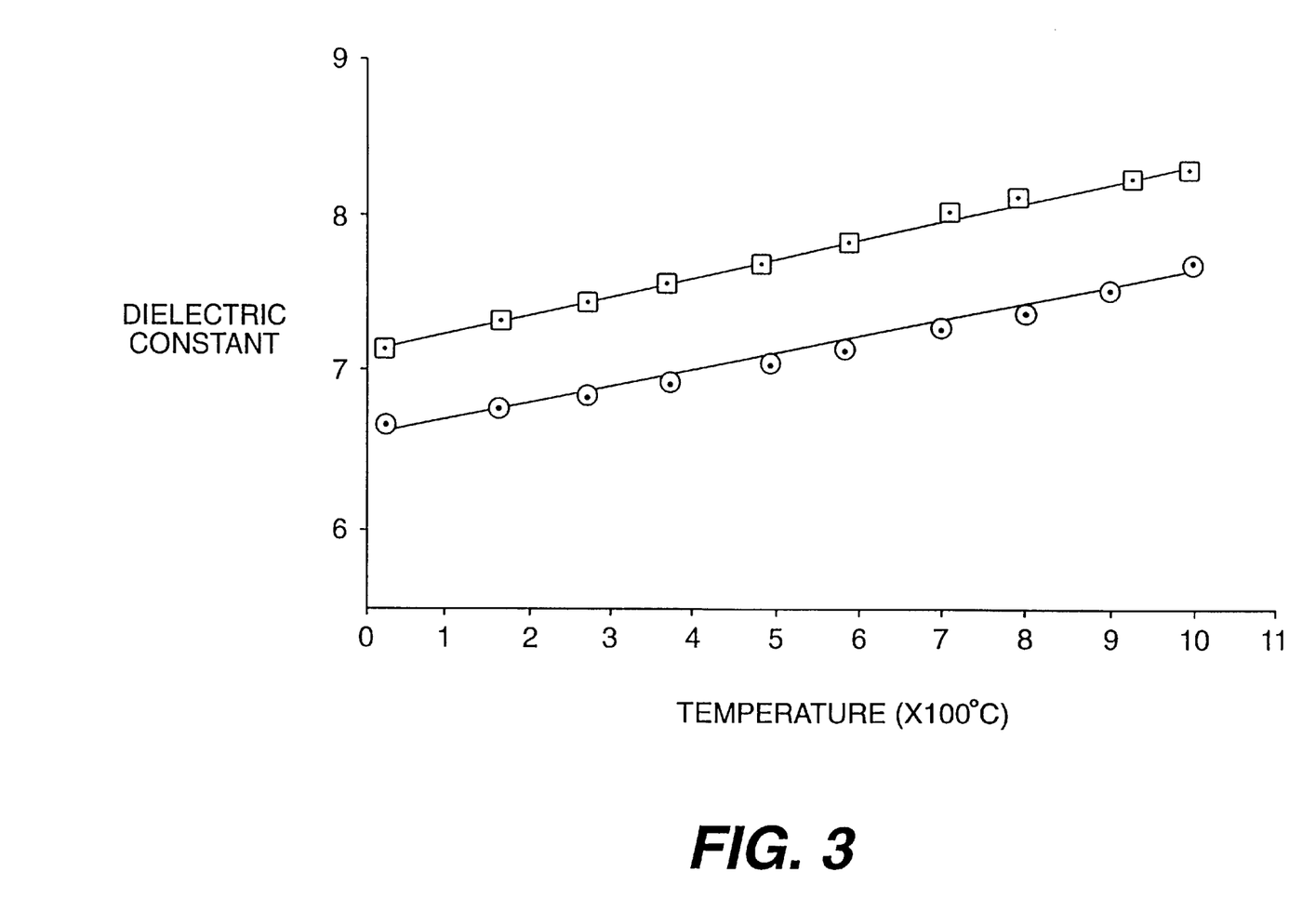
FIG. 3 is a graphical representation of dependency of dielectric constant upon temperature and compares the boron nitride toughened multiphase silicon aluminum oxynitride matrix composite of the prior art with boron nitride toughened single phase silicon aluminum oxynitride matrix composite of the present invention.
Figure 4:
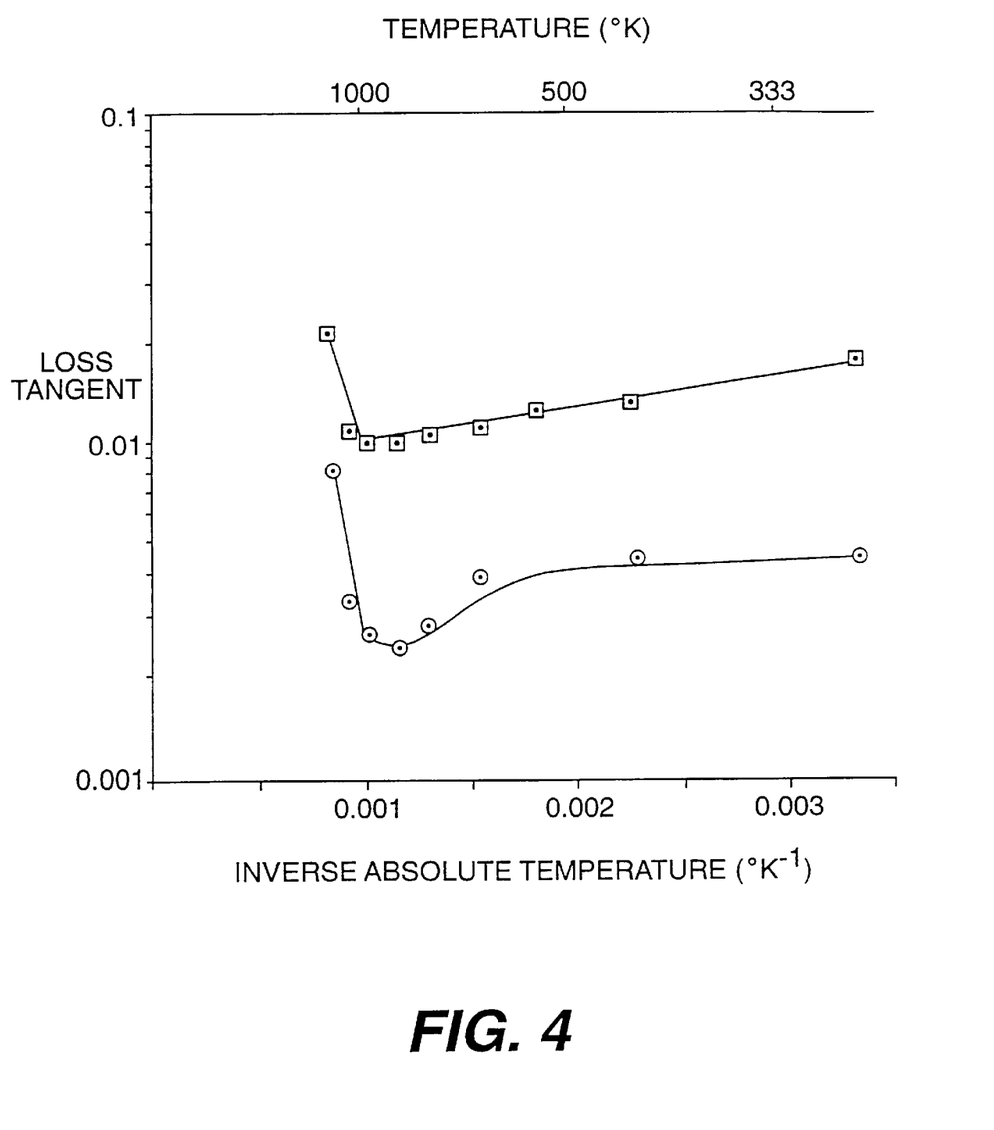
FIG. 4 is a graphical representation of dependency of loss tangent upon temperature and compares the boron nitride toughened multiphase silicon aluminum oxynitride matrix composite of the prior art with the boron nitride toughened single phase silicon aluminum oxynitride matrix composite of the present invention.
Figure 5:
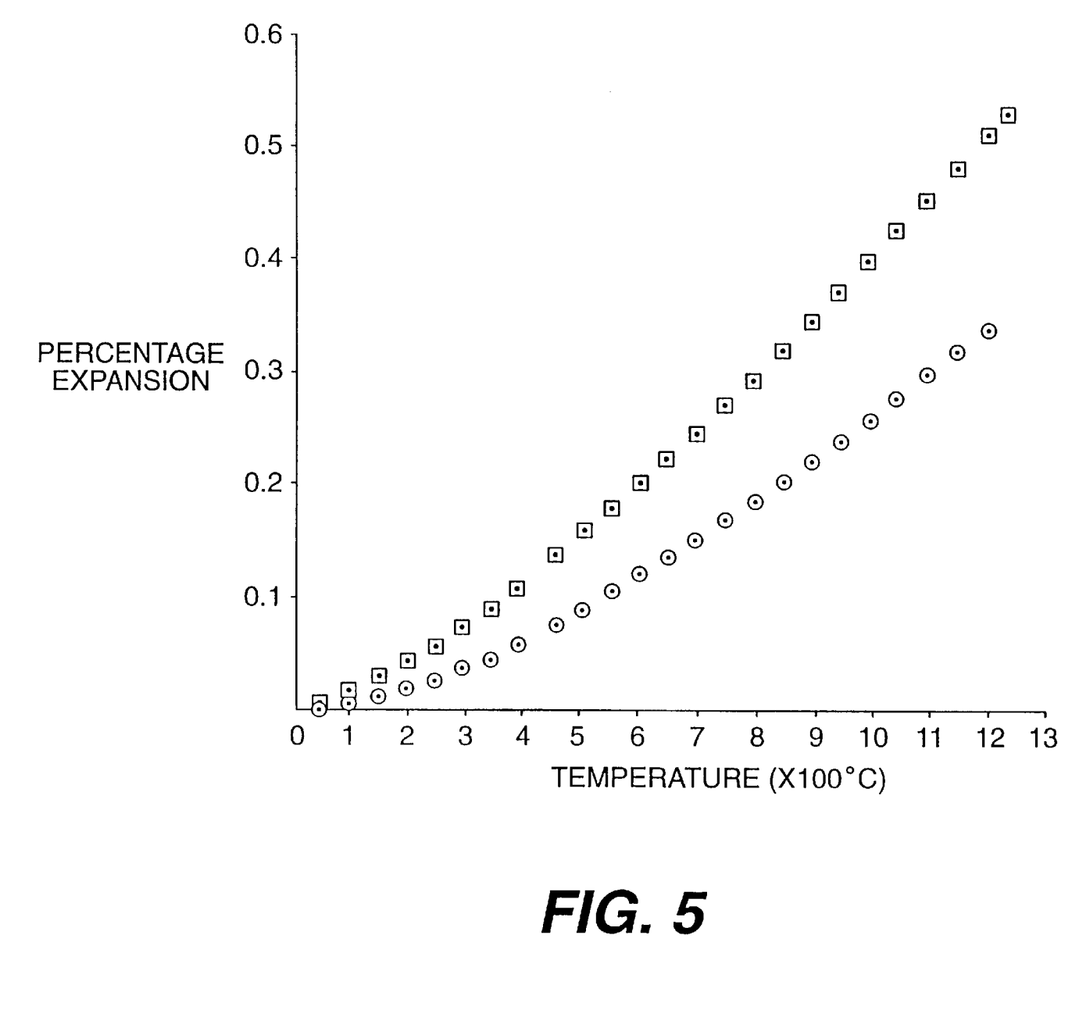
FIG. 5 is a graphical representation of thermal expansion and compares the boron nitride toughened multiphase silicon aluminum oxynitride matrix composite of the prior art with the boron nitride toughened single phase silicon aluminum oxynitride matrix composite of the present invention.

FIGS. 3, 4 and 5 illustrate the improvement of the composite of the present invention shown by the symbol "⊙" in the graphs over the prior art composites shown by the symbol "▪" in the graphs. The prior art composites are described in copending patent application Ser. No. 07/287,233 for Docket No. 39-RE-2767 of Dodds and Tanzilli filed concurrently herewith on Dec. 21, 1988 and assigned to the instant assignee. The copending application entitled, "Silica, Boron Nitride, Aluminum Nitride, Alumina Composites, Article and Method of Making Same" is incorporated herein by reference in its entirety and discloses and claims a multiphase ceramic composite made from boron nitride and a multiphase silicon aluminum oxynitride matrix wherein the multiphase silicon aluminum oxynitride matrix consists of reaction products of aluminum nitride, silica and alumina and wherein the boron nitride phase is uniformly distributed in the form of discrete particles throughout the multiphase silicon aluminum oxynitride matrix. The multiphase reaction products of aluminum nitride, silica and alumina are β'-Sialon with x=4 ($Si_2Al_4O_4N_4$), 8H aluminum nitride polytype and 15R aluminum nitride polytype, a multiphase matrix material. FIG. 3 of the accompanying drawings shows the improvement in dielectric constant vs. temperature of the boron nitride toughened single phase β'-Sialon matrix composite of the present invention where the matrix is $Si_2Al_4O_4N_4$ over the prior art boron nitride toughened multiphase Sialon matrix composite discussed above. FIG. 3 shows the improvement in temperature dependence of dielectric constant at 35 GHz. FIG. 4 shows the improvement in loss tangent in a graph of temperature dependence of loss tangent at 35 GHz for the composite of the present invention and the prior art composite. The combined lower dielectric constant and loss tangent, over the temperature range of room temperature to 1000° C., of the composite material of the present invention contribute to an electromagnetic antenna window with improved radar transmission characteristics over the composite material of the prior art. FIG. 5 shows the improvement in thermal expansion in a graph of percentage expansion vs. temperature for the composite of the present invention and the prior art composite. The lower thermal expansion coefficient of the composite material of the present invention contributes to an improved thermal shock resistance figure-of-merit compared to the composite material of the prior art.

EXAMPLES 2 AND 3

Precursor powder mixtures were prepared in the same manner set forth for the precursor powder mixture of Example 1 above. The amount of each of the ingredients (in grams) for the preparation of composites of the present invention wherein the single phase silicon aluminum oxynitride matrix is $Si_3Al_3O_3N_5$ is shown in Table II below:

TABLE II

AMOUNT OF MATRIX FORMING COMPOUNDS AND BORON NITRIDE IN COMPOSITES OF EXAMPLES 2 AND 3 FOR FORMATION OF $Si_3Al_3O_3N_5$

| | Example 2 (grams) | Example 3 (grams) |
|---|---|---|
| AlN | 30.82 | 27.80 |
| $Si_3N_4$ | 20.97 | 23.59 |
| $Al_2O_3$ | 2.25 | 6.00 |
| $SiO_2$ | 20.96 | 17.61 |
| BN | 25.00 | 25.00 |

All quantities shown in Table II are in grams. The amount of matrix-forming compounds, that is, the amount of single phase silica aluminum oxynitride-forming compounds required for each of the examples, was calculated by estimating that the amount of aluminum to be picked up in the composition during milling (grinding) by attrition of the alumina in the high purity alumina grinding media and estimating that the amount of alumina impurity in aluminum nitride would total 2.25 grams in Example 2 and 6.0 grams in Example 3. Thereafter, as in Example 1 above, the amount of silica impurity in the silicon nitride was estimated by simple analysis, and the amount of silica, silicon nitride, and aluminum nitride needed to yield 3 moles of silicon, 3 moles of aluminum, 3 moles of oxygen and 5 moles of nitrogen to produce $Si_3Al_3O_3N_5$ was calculated and added to the ball mill. The calculations were made such that the total amount of silicon nitride, aluminum nitride, alumina and silica powders was 75 grams, to which were added 25 grams of boron nitride. In Table II above, the respective amounts of each of the foregoing compounds are shown for Examples 2 and Example 3.

After the powders were ground and homogenized as set forth in Example 1, they were dried, passed through a sieve and hot pressed at 1760° C. and 3775 p.s.i. for 1 hour under flowing nitrogen as in Example 1.

The reaction product for Example 2 and Example 3 produced from the foregoing powder mixture of aluminum nitride, silicon nitride, silica and alumina was $Si_3Al_3O_3N_5$ and has been discussed above relative to the quaternary phase diagram as shown in FIG. 1. As discussed above, x-ray diffraction analysis revealed the particular single phase matrix reaction product and the dispersion of the boron nitride as a discrete, separate phase throughout the single phase silicon aluminum oxynitride matrix corresponding to the formula $Si_3Al_3O_3N_5$. Both Examples 2 and 3 resulted in identical composites.

The physical properties of the foregoing ceramic composite materials of Examples 2 and 3 having about 30 percent by volume boron nitride dispersed in the $Si_3Al_3O_3N_5$ matrix are listed in Table III below:

TABLE III

PHYSICAL PROPERTIES OF BORON NITRIDE/$Si_3Al_3O_3N_5$ CERAMIC COMPOSITE MATERIAL OF EXAMPLES 2 AND 3

Density: 2.70 gm/cc
Modulus of Rupture: 43,250 p.s.i.
Modulus of Elasticity: 17.5 msi
Dielectric Constant, 35 GHz, 25° C.: 6.706
Loss Tangent, 35 GHz, 25° C.: 0.00459

The combination of moderate thermal expansion, low thermal conductivity and low loss tangent and dielectric constant from room temperature to 1000° C. make the ceramic composite material of the present invention excellent antenna window materials. Furthermore, the boron nitride particulate phase wherein the boron nitride is uniformly dispersed throughout the single phase silicon aluminum oxynitride matrix provides a toughening mechanism which also makes the ceramic composite material of the present invention an excellent antenna window material.

While numerous modifications, changes, substitutions, variations and equivalents of the present invention will now occur to those skilled in the art, it is intended that the invention be limited only by the spirit and scope of the appended claims.

What is claimed is:

1. A multiphase ceramic composite comprising, boron nitride and a single phase silicon aluminum oxynitride matrix corresponding to the formula:

$$Si_{6-x}Al_xO_xN_{8-x}$$

where x is at least 0.1 and less than or equal to 4.2, the single phase silicon aluminum oxynitride matrix being the reaction product of at least three silicon aluminum oxynitride-forming compounds selected from the group consisting of aluminum nitride, silicon nitride, silica and alumina, wherein the boron nitride is uniformly distributed in the form of discrete particles throughout the single phase silicon aluminum oxynitride matrix, the boron nitride having a maximum particle size of about 10 microns.

2. The multiphase ceramic composite of claim 1 wherein the single phase silicon aluminum oxynitride matrix is the reaction product of aluminum nitride, silicon nitride, silica and alumina.

3. The multiphase ceramic composite of claim 1 wherein x is 3.

4. The multiphase ceramic composite of claim 1 wherein x is 4.

5. The multiphase ceramic composite of claim 1 wherein the single phase silicon aluminum oxynitride matrix is at least about 60% by volume of the composite and the balance is boron nitride.

6. The multiphase ceramic composite of claim 1 wherein the single phase silicon aluminum oxynitride matrix is between about 70% by volume and 90% by volume of the composite and the balance is boron nitride.

7. The multiphase ceramic composite of claim 1 wherein the boron nitride particle size is about 0.5 micron to about 5 microns.

8. A window transparent to electromagnetic radiation in a predetermined frequency spectrum, the window consisting essentially of a multiphase ceramic composite having a composition comprising boron nitride and a single phase silicon aluminum oxynitride matrix corresponding to the formula:

$$Si_{6-x}Al_xO_xN_{8-x}$$

where x is at least 0.1 and less than or equal to 4.2, the single phase silicon aluminum oxynitride matrix being the reaction product of at least three silicon aluminum oxynitride-forming compounds selected from the group consisting of aluminum nitride, silicon nitride, silica and alumina, wherein the boron nitride is uniformly distributed in the form of discrete particles throughout the single phase silicon aluminum oxynitride matrix, the boron nitride having a maximum particle size of about 10 microns.

9. The window of claim 8 wherein the single phase silicon aluminum oxynitride matrix is the reaction product of aluminum nitride, silicon nitride, silica and alumina.

10. The window of claim 8 wherein x is 3.

11. The window of claim 8 wherein x is 4.

12. The window of claim 8 wherein the single phase silicon aluminum oxynitride matrix is at least about 60% by volume of the composite and the balance is boron nitride.

13. The window of claim 8 wherein the single phase silicon aluminum oxynitride matrix is between about 70% by volume and 90% by volume of the composite and the balance is boron nitride.

14. The window of claim 8 wherein the boron nitride particle size is about 0.5 micron to about 5 microns.

15. A method for the fabrication of a multiphase composite ceramic material containing boron nitride and a single phase silicon aluminum oxynitride matrix comprising:

(a) forming a homogeneous, finely-divided mixture of boron nitride and effective amounts of at least three silicon aluminum oxynitride-forming compounds selected from the group consisting of aluminum nitride, silicon nitride, silica and alumina, the relative proportions of which are sufficient to form a single phase silicon aluminum oxynitride matrix corresponding to the formula:

$$Si_{6-x}Al_xO_xN_{8-x}$$

where x is at least 0.1 and less than or equal to 4.2; and (b) compacting the homogeneous, finely-divided mixture at an elevated temperature and pressure for a sufficient time to form the single phase silicon aluminum oxynitride as a reaction product of at least three of the silicon aluminum oxynitride-forming compounds, the boron nitride being uniformly distributed in the form of discrete particles throughout the single phase silicon aluminum oxynitride matrix.

16. The method of claim 15 wherein the single phase silicon aluminum oxynitride matrix is the reaction product of aluminum nitride, silicon nitride, silica and alumina.

17. The method of claim 15 wherein x is 3.

18. The method of claim 15 wherein x is 4.

19. The method of claim 15 wherein the mixture comprises at least about 60% by volume based on the total volume of the composite of single phase silicon aluminum oxynitride matrix and the balance boron nitride.

20. The method of claim 15 wherein the mixture comprises between about 70% by volume and about 90% by volume based on the total volume of the composite of single phase silicon aluminum oxynitride matrix and the balance boron nitride.

21. The method of claim 15 comprising mixing finely-divided powders of at least three silicon aluminum oxynitride-forming compounds selected from the group consisting of aluminum nitride, silicon nitride, silica and alumina having a maximum particle size of about 74 microns, to form the homogeneous, finely-divided mixture.

22. The method of claim 15 wherein the homogeneous, finely-divided mixture is compacted at a temperature of at least about 1,760° C. and a pressure of at least about 3,775 p.s.i. for at least about 1 hour in a protective environment.

23. The method of claim 22 wherein the homogeneous, finely-divided mixture is compacted in a boron nitride-lined graphite die under flowing nitrogen gas.

24. The method of claim 15 comprising grinding boron nitride and at least three silicon aluminum oxynitride-forming compounds selected from the group consisting of aluminum nitride, silica, silicon nitride and alumina in a ball mill using alumina grinding media for a sufficient time to form a homogeneous, finely-divided mixture of boron nitride and silicon aluminum oxynitride-forming compounds, the alumina for the silicon aluminum oxynitride-forming compounds being generated in the mixture by attrition of the alumina grinding media.

25. The method of claim 24 comprising grinding boron nitride and at least three members selected from the group consisting of aluminum nitride, silica, silicon nitride and alumina in a ball mill using alumina grinding media and an inert liquid organic medium for a sufficient time to form a wet, homogeneous mixture; drying the wet, homogeneous mixture and converting the dried mixture to a finely-divided mixture therefrom.

26. The method of claim 25 wherein the liquid organic medium is reagent-grade acetone.

27. The method of claim 25 wherein the wet, homogeneous mixture is dried with nitrogen gas and converted to a finely-divided mixture by passing the dried mixture through a sieve.

28. The method of claim 27 wherein the homogeneous, finely-divided mixture is compacted at a temperature of at least about 1,760° C. and a pressure of at least about 3,775 p.s.i. for at least about 1 hour in a protective environment.

29. A method for fabrication of a window transparent to electromagnetic radiation comprising:

(a) grinding a mixture of boron nitride and effective amounts of at least three silicon aluminum oxynitride-forming compounds selected from the group consisting of aluminum nitride, silicon nitride, silica and alumina, the relative proportions of which are sufficient to form a single phase silicon aluminum oxynitride matrix corresponding to the formula:

$$Si_{6-x}Al_xO_xN_{8-x}$$

where x is at least 0.1 and less than or equal to 4.2, the alumina being provided in the mixture by grinding in a ball mill containing an organic liquid and alumina grinding media for a sufficient amount of time to provide the relative proportion of alumina to the mixture from the attrition of the alumina grinding media, to form a finely-divided, homogeneous mixture containing boron nitride having a maximum particle size of about 10 microns;

(b) drying the finely-divided homogeneous mixture;

(c) optionally passing the dried, finely-divided homogeneous mixture through a sieve to remove agglomerated particles; and (d) compacting the dried, finely-divided homogeneous mixture in a inert atmosphere at a temperature of at least about 1760° C. and a pressure of at least about 3,775 p.s.i. in a boron nitride-lined graphite die for a sufficient time to form a compacted composite of the single phase silicon aluminum oxynitride matrix from the aluminum nitride, silicon nitride, silica and alumina, the boron nitride being uniformly distributed in the form of discrete particles throughout the single phase silicon aluminum oxynitride matrix, whereby the compacted composite is suitable as a window transparent to electromagnetic radiation.

30. The method of claim 29 for the fabrication of an antenna window.

\* \* \* \* \*